Patented Nov. 18, 1941

2,263,195

UNITED STATES PATENT OFFICE 2,263,195

MANUFACTURE OF HIGHER ALCOHOLS BY REDUCTION WITH SODIUM AMALGAM

Seishichi Shikata, Nishiku, Osaka, and Yoshiyuki Inoue, Kamikyoku, Kyoto, Japan

No Drawing. Application December 20, 1937, Serial No. 180,916. In Japan February 15, 1937

1 Claim. (Cl. 260—638)

This invention relates to a manufacturing process of higher alcohols from the corresponding fatty acid derivatives, such as acid chlorides, acid anhydrides and glycerides, comprising continuous treatment of a solution in organic solvents of one of the starting materials with sodium amalgam freshly prepared and unaffected by the atmosphere.

The object of the invention is to obtain a process which gives a high yield with the utmost simplicity in which the use of any catalyst, high pressure or a risk of coloring of the product may be avoided.

Up to now 200 atmospheres and an intense heat of 300° C. as well as special catalysts have been necessary for the reduction of higher fatty acids with hydrogen to corresponding alcohols. In such a process the special conditions for reaction should be observed carefully; otherwise, there would often be a danger of hydrocarbons or condensation products being produced. As is well known it is theoretically possible to produce alcohols from fatty acids or their derivatives with metallic sodium or sodium amalgam as a reducing agent. Metallic sodium is however economically unpractical; amalgam can not be used with advantage as a reducing agent of organic compounds on a large production scale as the action of amalgam is restricted to its surface so that the inner portion of mercury is left inert.

According to the present invention sodium amalgam obtained by electrolysis of sodium chloride solution with a mercury cathode is immediately led into a reduction chamber and allowed to react with fatty acid derivatives, such as acid chlorides, acid anhydride, and glycerides dissolved in organic solvents under the ordinary pressure and at the room temperature or moderately warmed.

The concentration of the amalgam should be regulated by taking out a minute test-portion and examining the liquidity of the mercury. Mercury is renewed, whenever desirable, while reduction is kept up. The formation of the amalgam is analogous to the manufacturing process of sodium hydroxide and chlorine by electrolysis of sodium chloride solution with the mercury cathode. The advantages of this process are the practicability of economical production of higher alcohols by the use of freshly prepared sodium amalgam.

The following are some practical examples of the process of this invention:

1. Let us call one of the two neighboring chambers a reduction chamber and the other an electrolysis chamber. Into the reduction chamber is introduced a solution of palmitic acid chloride and methanol in the ratio of 30:100 and heated up to 60° C. under a reflux condenser. Heating may be effected by sending warm water through a tube which is disposed in the chamber. From the electrolysis chamber sodium amalgam of 0.01% obtained by electrolysis of sodium chloride solution is pumped into the reduction chamber and renewed when required with the aid of a turbine; chlorine produced in the electrolysis chamber is led into the storage tank by a pipe. The reduction is allowed to go on for about two hours; in the meantime, the percentage of unsaponifiable matter is examined and also its degree of reaction. When the solution is driven out of the reduction chamber a new acid chloride solution run in and treated in the same manner. The solution from the reduction chamber is distilled for the recovery of the solvent and the residue is mixed with a large quantity of a warm alkaline solution, agitated and cooled; the semi-solid matter which gathers in the upper layer is collected and distilled off as palmitic alcohol by the ordinary process.

2. Into the reduction chamber is introduced a mixture of lauric acid anhydride, toluene saturated with water and phosphoric acid in the ratio of 20:100:5 and treated as in the previous example. To the solution which has run out of the reduction chamber is added a large quantity of water so as to form two layers. By distilling separately the layer of toluene lauryl alcohol is obtained.

3. The reduction chamber is filled with a mixture of coconut oil, methanol and glacial acetic acid in the ratio of 20:100:3, reduced and distilled as in the preceding example when coconut oil alcohol is obtained.

4. 5 parts of sodium bisulphate are suspended in 2 parts of hydrogenated soya-bean oil heated up to the melting point (sometimes a small quantity of water is to be added) and treated as in the former example. From time to time a minute test-portion is taken out and the reduction is examined by heating with sodium hydroxide solution, until it shows no sign or practically no sign of saponification. Thereupon, a greater part of the solution is run out and a new hydrogenated soya-bean oil and sodium bisulphate is added while electrolysis and renewal of mercury in the other chamber is being constantly continued. The warm solution removed from the chamber is filtered off from inorganic salts and allowed to cool to deposit higher alcohols from which glycerine is separated by means of vacuum filtering or vacuum fractional distillation. In this process the solution in the reduction chamber becomes neutral.

What we claim is:

A process of manufacturing higher alcohols from a corresponding fatty acid derivative of the class consisting of, acid chlorides, acid anhydrides and glycerides comprising continuously treating a solution in an organic solvent of the starting material with freshly prepared sodium amalgam, unaffected by the atmosphere.

SEISHICHI SHIKATA.
YOSHIYUKI INOUE.